Jan. 8, 1952   F. J. HANSGIRG   2,582,119
PRODUCTION OF MAGNESIUM
Filed Sept. 24, 1946   2 SHEETS—SHEET 1

Inventor
FRITZ J. HANSGIRG
By Watson, Cole, Grindle & Watson
Attorney

Jan. 8, 1952     F. J. HANSGIRG     2,582,119
PRODUCTION OF MAGNESIUM
Filed Sept. 24, 1946     2 SHEETS—SHEET 2
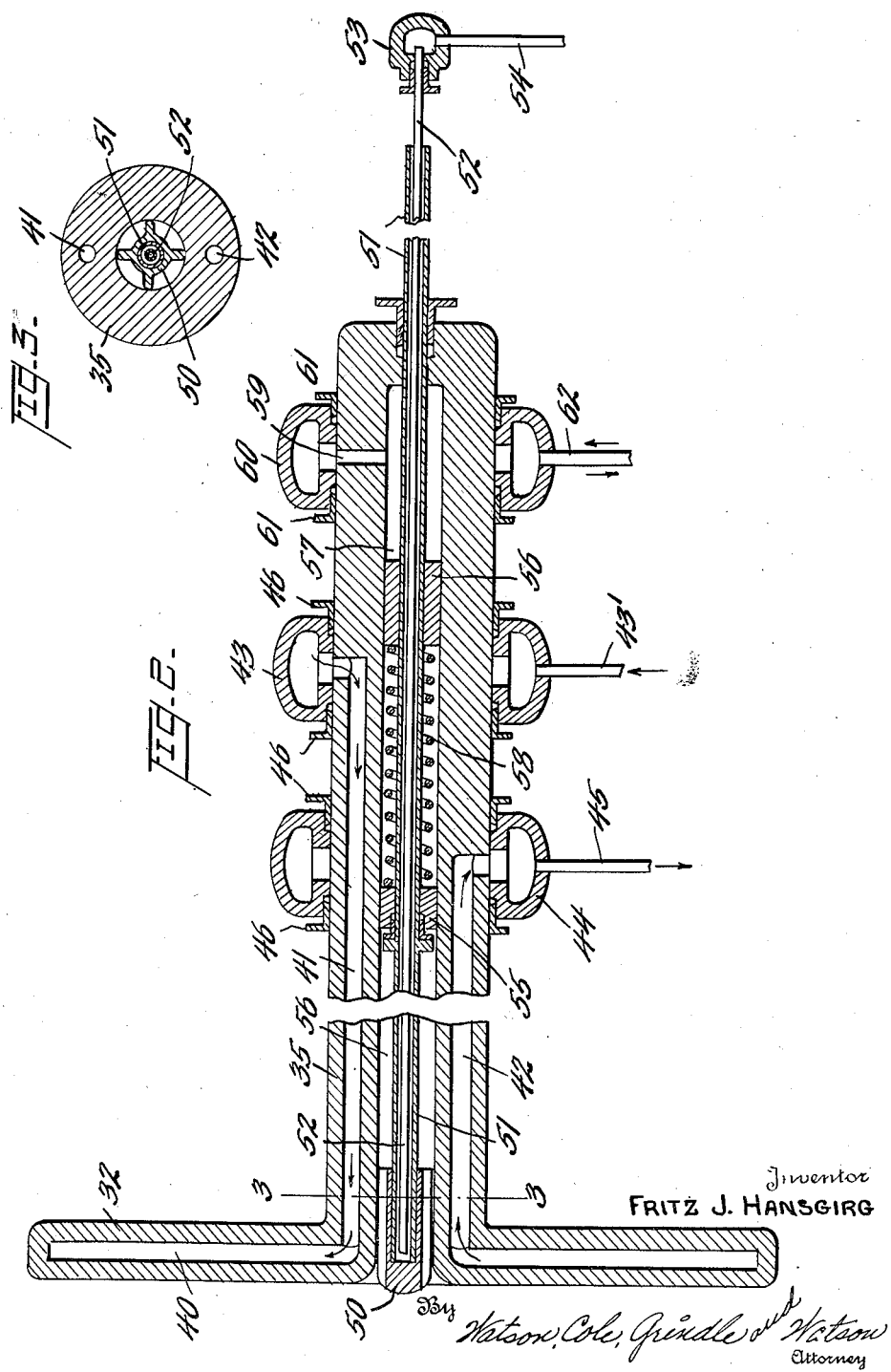
Inventor
FRITZ J. HANSGIRG
By Watson, Cole, Grindle & Watson
Attorney Patented Jan. 8, 1952

2,582,119

UNITED STATES PATENT OFFICE 2,582,119

PRODUCTION OF MAGNESIUM

Fritz John Hansgirg, Black Mountain, N. C.; Josefine Maria Hansgirg, administratrix of said Fritz John Hansgirg, deceased, assignor to North Carolina Magnesium Development Corporation, Asheville, N. C., a corporation of North Carolina Application September 24, 1946, Serial No. 698,984

2 Claims. (Cl. 266—16)

This invention relates to the production of metallic magnesium and has for its general object the provision of certain novel improvements in apparatus applicable to the carbo-thermal process for producing magnesium.

This application is a continuation-in-part of my copending application Serial No. 543,702, filed July 6, 1944, now abandoned.

As is well known to those skilled in the art, in the carbo-thermal reduction process, magnesium oxide is reduced by carbon according to the equation:

$$MGO + C \rightleftarrows Mg + CO$$

From this highly reversible reaction, magnesium can be recovered only if the gaseous products of reaction, magnesium vapor and carbon monoxide, which are stable at 2000° C., are suddenly cooled to about 200° C., at which temperature the reaction of the magnesium on carbon monoxide is slow enough to ensure that back reaction is prevented. For effecting this shock cooling, different methods have been proposed; for example, the admixture of inert gases with the hot products of reaction at the moment they are discharged from the reduction chamber. For this purpose, hydrogen, hydro-carbon gases, or inert gases like argon have been proposed. Also sprays of liquids such as hydro-carbons or liquid metals such as lead or tin, have been suggested. Finally, even the introduction of solid sprays has been proposed, as for example, mixtures of hydrogen and solid powders of magnesium chloride, to make use of the cooling effect of the heat of fusion.

All of these methods have been partially successful but in every case there have been certain disadvantages. In chilling with hydrogen, it is necessary to recover the admixed carbon monoxide from the hydrogen gas for the purpose of recycling the hydrogen into the process. The chilling with hydrocarbons has the disadvantage that some decomposition takes place and the magnesium dust so recovered is contaminated by excess carbon and also by absorbed heavy gases which make it difficult to briquette such dust for the final operation. The metallic sprays also give incomplete protection against back reaction and it is difficult to recover the magnesium from the alloys so formed.

One prior proposal suggests first cooling the gaseous magnesium and carbon monoxide down to the dew point by means of a cool inert gas, and then effecting further cooling and the condensation of the magnesium by contact with a slowly moving cold surface. This method is ineffective to produce any satisfactory yield of magnesium since the speed of back-reaction is so fast that at the dew point (about 1150° C.) a greater part of the magnesium will be reconverted into magnesium oxide and carbon.

The applicant has found that the chilling of the gases must be effected within a period of from $\frac{1}{1000}$ to $\frac{1}{5000}$ of a second and must proceed down to a point approximating 250° C. before it can be said that the losses by back-reaction are negligible. If by the fastest methods of gas cooling, the mixture is brought down to about 660° C., some magnesium can be condensed but a yield of more than 30% of magnesium cannot be expected, and the particles of magnesium recovered will be coated with the back-reacted material, magnesium oxide and carbon.

It is therefore the purpose of the present invention to provide means for shock cooling or chilling a body of gaseous magnesium and carbon monoxide upon a cold surface at a high speed of contact. The applicant has determined experimentally that the heat transfer between the gases coming out of the furnace at comparatively low speed is not great enough to effect the shock cooling with a velocity which is greater than the velocity of the back reaction. It is known that the heat transfer coefficient between a gas and a solid surface increases nearly proportionately to the velocity of the gas against such surface. It is therefore possible to effect a shock cooling with high enough speed, if the gaseous products of reaction between the magnesium oxide and the carbon are carried along a water cooled metallic surface with a very high velocity. To so discharge the gas against a stationary cooled surface would, of course, require that a high pressure be maintained in the reduction furnace. Such procedure would be impractical since it is already difficult enough to maintain an electric reduction furnace gastight in operation at high temperatures with only a slight over-pressure against the outside atmospheric pressure.

It is therefore the aim of the present invention to effect the shock cooling of the gases on rapidly moving water-cooled chilling surfaces, where the heat will be transferred from the gaseous products of reaction to these cooling surfaces in a very short time. It is preferred that the zone of contact be rather shallow and in practice it may comprise a narrow clearance space between confining surfaces having a high rate of relative velocity, one or both of said surfaces being cooled. At the same time, by a proper arrangement of apparatus, the dust containing the metallic magnesium is immediately moved from the cooled surface upon which it condenses, so that a clean surface is always exposed to new mixtures of magnesium vapor and carbon monoxide. To aid in preventing any subsequent action of carbon monoxide in high concentration, if desired, a quantity of protective gas may be introduced at the same time; but the amount to be used is so much smaller in this case than in prior processes, since it is neither necessary nor possible to remove all of the heat from the gaseous products of reaction in the extremely short period of time allowed, merely by admixing therewith a cooled gas to lower the temperature of the total gas volume according to the laws of gaseous mixtures.

Other objects and features of novelty will be apparent from the following specification when read in connection with the accompanying drawings in which one embodiment of the invention is illustrated by way of example.

In the drawings:

Figure 2 is a view in vertical section of the shock cooling arrangement; and

Figure 3 is a cross-sectional view through the reamer head for cleaning the furnace discharge opening.

Figure 1:
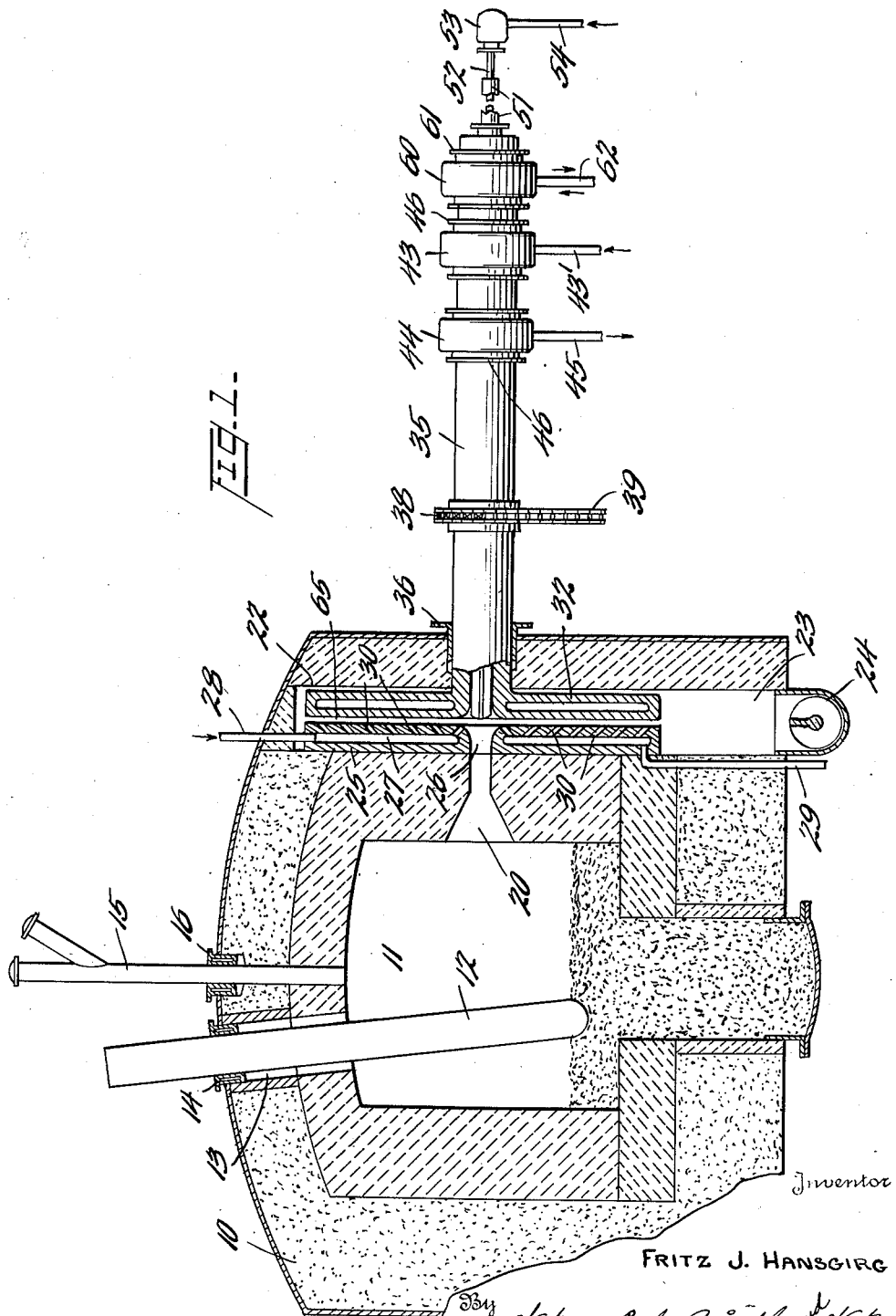
Figure 1 is a diagrammatic view in vertical section of a reduction furnace, showing the shock cooling installation chiefly in elevation.

In Figure 1 of the drawings, the reduction furnace, wherein the magnesium oxide and carbon are converted into magnesium vapor and carbon monoxide, is designated generally by the reference numeral 10. The furnace may be built up of carbon blocks and arches in the usual way, and jacketed with an airtight covering of sheet metal. The crucible chamber of the furnace is indicated at 11 and it will be seen that an electrode 12 enters the chamber through an opening 13, the opening being sealed around the electrode by means of a water-cooled airtight gland indicated diagrammatically at 14. The reduction furnace is charged through the feeder tube 15 which is also sealed off by means of a suitable gland as indicated at 16. According to the usual practice a bed of hot granulated coke or carbon dust is formed in the chamber 11 in which the electrode 12 is immersed. The briquetted raw material is introduced through the feeder tube 15 and it gasifies immediately. The magnesium vapors and carbon monoxide resulting from the reduction reaction leave the furnace through the opening 20 in the side wall thereof.

The shock cooling installation is disposed closely adjacent the furnace, and in the present illustrated embodiment is indeed housed within the confines of the exterior wall of the furnace itself. Within this furnace wall there is formed a relatively narrow vertically disposed chamber 22 which is well insulated from the combustion or reaction chamber 11 of the furnace. The chamber 22 extends downwardly below the level of the combustion chamber and terminates in a trough 23. Any suitable discharge means for the material resulting from the shock cooling of the gases may be provided within the trough 23, for example, the screw conveyor 24.

Within the cooling chamber 22, and preferably against the inner wall thereof is disposed a hollow metallic box 25 which may be of disclike configuration and which has a central opening 26 therein forming a continuation of the discharge opening 20 from the furnace proper. The hollow interior space 27 of the box 25 is provided with pipes 28 and 29 for the introduction of an inert gas for the purpose of diluting the reacting gases and furnishing incidental cooling. A multiplicity of openings 30 are provided in the outer face of this box 25 so as to discharge this gas into the cooling chamber.

Facing the disclike box or hollow wall 25 is a similar hollow disc 32, the face of this disc lying rather close to the perforated face of the disc 25 to provide a narrow space between these surfaces for the reaction gases. In the case of a furnace of the capacity of say one-half metric ton of magnesium per hour and which produces a gas quantum of about 2.2 cubic meters per second measured at 2000° C., the discs may well be of the order of from four to six and one-half feet in diameter and the clearance space approximately one inch wide. However, these approximations may be varied and, of course, some of them would neceessarily change with variations in the size of the furnace installation. The hollow disc or plate 32 is mounted to rotate within the chamber 22 about a horizontal axis which preferably coincides with the axis of the opening 20. The disc 32 is carried by or forms an integral part of the rotatable hollow shaft 35, which rotates in the water or oil cooled gland bearing 36 in the outer wall portion of the furnace 10. Any other bearing supports which shall be found necessary may be provided for the outer portions of the hollow shaft 35. In order to drive the shaft a spocket such as that indicated at 38 may be fixed upon the shaft and the device may be connected to a motor or other suitable source of power as by means of the drive chain 39.

Cooling fluid is led to and from the hollow interior 40 of the disc 32 through the passageways 41 and 42, the former receiving fluid from the intake header ring 43 and the latter discharging into the similarly formed ring 44 which surrounds the shaft 35. These header or manifold rings are held stationary and are provided respectively with intake and outlet pipes 43' and 45. Sealing glands or rings 46 are provided to prevent leakage during the rotation of the shaft. An axially disposed reamer or scraper head 50 is disposed for movement axially of the shaft 35 so that it may be periodically projected into the discharge opening 26 of the furnace in order to keep the opening clean. The reamer head 50 is cruciform in cross section as indicated in Figure 3 of the drawings. This reamer head is cooled by water or oil supplied through the central hollow pipe or shaft 51 in which is centered a tube 52. This tube 52 is received within a non-rotatable head 53 which is supplied with cooling liquid through the pipe 54. The hollow reamer shaft 51 passes through a packed supporting block 55 carried within the hollow interior chamber 56 of the rotating shaft 35. Fixed to the reamer shaft 51 at a point to the right of its center as viewed in Figure 2 is a piston member 56 which fits within the cylindrical inner chamber 57 provided upon the right hand side of the central plug or block 55. Between the block 55 and the piston 56 there is disposed a coil compression spring 58 which urges the reamer toward its retracted position. A duct 59 leads from the chamber 57, upon the right hand side of the piston 56, to a hollow stationary ring 60 which surrounds the shaft 35 and is sealed thereagainst by means of the gland or packing 61. The head 60 is provided with a pipe connection 62 through which pressure fluid may be introduced or withdrawn. When pressure fluid is introduced to the ring 60 and the chamber 57, the piston 56 is moved toward the left and forces the reamer head 50 toward the opening 20, 26 and thus cleans out any deposits which may have accumulated in the opening. The cross shaped configuration of the reamer head permits the furnace gases to discharge through the opening even when the reamer is inserted therein. The operation of the hydraulically moved reamer may be effected either at will or automatically and periodically. For example the admission and discharge of pressure fluid through the pipe 62 may be controlled by suitable well-known clock-work or timing control mechanism, suggested at 62A in Figure 1.

In operation the gases discharged through the openings 20, 26 pass into the flat narrow space 65 between the adjacent surfaces of the stationary disc 25 and the rotating disc 32. The disc 32 is preferably rotated at a rather high velocity and thus a very rapid speed of contact between the gases and the cooling disc is effected.

The applicant has determined that the relative velocity of the gases to be chilled, with respect to the chilling surface should be from about 150 to about 1000 feet per second. This suggests a speed of the disc 32 and shaft 35 of approximately 1200 R. P. M. in the case of an installation of the approximate dimensions and capacity mentioned above.

Preferably, at the same time that the surface cooling of the gases is being accomplished, jets of cooled hydrogen or other gases inert to magnesium are discharged through the opening 30 in the outer surface of the stationary disc 25. For a maximum yield the carbon monoxide concentration should not be higher than about 30% of the gas with which the magnesium dust remains in contact for the time necessary to separate it from the gas stream.

The effect of the rapid surface cooling, and especially as employed in conjunction with the diluent inert gas, is to greatly improve the recovery of magnesium from any of the carbo-thermal reduction processes.

It is understood that various changes and modifications may be made in the apparatus and procedures illustrated and described herein without departing from the scope of the invention as defined by the subjoined claims. For example, the chilling member might be one having a cooled surface moving rectilinearly instead of rotatively in contact with the stream of gases at the high relative velocity required.

Having thus described the invention, what is claimed as new and desired to be secured by Letters Patent is:

1. Apparatus for producing metallic magnesium comprising, in combination, a reduction furnace for the thermal reduction of magnesium compounds, a magnesium condensing chamber adjacent said furnace, a discharge opening providing a passageway for the resulting gaseous mixture of magnesium vapor and carbon monoxide from the furnace to the chamber, two wide parallel dry walls disposed downstream of said passageway and well within the confines of said chamber, the mutually facing surfaces of said wall being spaced apart only a slight distance throughout their extent to provide a wide but very thin shock-cooling zone through which the gases from said opening flow in the form of a thin sheet, means for cooling one of said wall surfaces, and means for rapidly moving said cooled wall in its own plane relative to said zone, means for cooling the other wall surface, means for injecting diluent gas which is inert to magnesium directly into said thin shock-cooling zone, whereby said diluent gas is applied to the thin sheet of gases at the time they are being subjected to the rapid shock cooling, said last named means and said means for cooling the other of said wall surfaces including the following provisions; means forming an enclosed space behind said last named wall surface, means for supplying such cool diluent gas to said space, and a plurality of outlet orifices leading from said space through said wall surface and opening directly into said thin shock-cooling zone.

2. Apparatus for producing metallic magnesium comprising, in combination, a reduction furnace for the thermal reduction of magnesium compounds, a condensing chamber adjacent said furnace, a discharge opening providing a passageway for the gaseous products of reduction from the furnace to the chamber, a rotatable disc in said chamber having a surface facing said opening and against which the gases must impinge, means for cooling said disc, a hollow shaft upon which the disc is carried, said disc also being hollow, means for supplying cooling fluid to the interiors of said shaft and disc, means for rotating said shaft and consequently said disc, a reamer carried axially by the rotatable disc and shaft, and hydraulically actuated means disposed within said shaft for projecting said reamer periodically into the discharge opening and withdrawing it therefrom, and hydraulic connections for supplying operating fluid through said hollow shaft to said hydraulically actuated projecting means while the shaft is rotating.

FRITZ JOHN HANSGIRG.

REFERENCES CITED

The following references are of record in the file of this patent:

UNITED STATES PATENTS

| Number | Name | Date |
| --- | --- | --- |
| 1,530,154 | Caspari | Mar. 17, 1925 |
| 2,018,265 | Kemmer | Oct. 22, 1935 |
| 2,018,266 | Kemmer | Oct. 22, 1935 |
| 2,060,070 | Hansgirg | Nov. 10, 1936 |
| 2,238,908 | McConica, 3rd | Apr. 22, 1941 |
| 2,391,727 | McConica, 3rd | Dec. 25, 1945 |